Aug. 22, 1967     J. A. LUCEY     3,337,712
ELECTRIC WELDING OF UPWARDLY EXTENDING SEAMS
Filed Aug. 3, 1966

INVENTOR
JOHN ANTHONY LUCEY

BY Townshend & Mescrole

ATTORNEYS ated Aug. 22, 1967

United States Patent Office 3,337,712

3,337,712
ELECTRIC WELDING OF UPWARDLY EXTENDING SEAMS
John Anthony Lucey, Chalfont St. Peter, England, assignor to The British Oxygen Company Limited, a British company
Filed Aug. 3, 1966, Ser. No. 569,891
Claims priority, application Great Britain, Aug. 5, 1965, 33,580/65
11 Claims. (Cl. 219—136)

ABSTRACT OF THE DISCLOSURE

A fabricated consumable nozzle for consumable nozzle electroslag or electrogas welding comprises at least three wires, straight or helical, disposed side by side and together forming a closed ring in cross-section. Preferably four wires are used, tack welded together, the central orifice formed therein being used to guide an electrode wire to the welding point.

---

This invention relates to the electric welding of upwardly extending seams between metal workpieces, particularly where a consumable guide or nozzle disposed in the seam is used to guide an electrode wire to the welding point such as in consumable nozzle electroslag welding where the electrode wire is melted off in a bath of molten slag. The invention is also applicable to electrogas welding where the electrode wire is melted off under cover of a protective gas shield.

Consumable nozzle electroslag welding is typically used in producing a vertical butt weld between two metal plates set up with a gap between the plate edges to be joined. The gap is bridged by water-cooled shoes adapted to support solidifying weld metal deposited between the plate edges, and this weld metal is supplied by an electrode wire and the consumable nozzle. A wire feeding mechanism is mounted at the upper end of the length of seam to be welded, generally at the top of the plates, and the consumable nozzle is disposed in the seam with its upper end supported in proximity to the wire feed mechanism and its lower end just above the welding point. In operation, the electrode wire is fed down the consumable nozzle to the welding point, where the deposited weld metal is covered by a layer of molten slag, and welding current is conducted into the consumable nozzle through its support and thence to the electrode wire.

For high quality welds it is necessary for the electrode wire and consumable nozzle to be formed of metal compatible with the parent plate metal and whose composition is closely controlled. Such material is generally available in the form of welding wires but not in the form of tubes having a sufficient wall thickness to carry the welding current, and the cost of having tubes produced from such material, particularly compositions for welding alloy steels, is necessarily high because of the relatively small demand for such tubes.

It is an object of the present invention to provide a construction of consumable nozzle which may be fabricated from welding wire.

According to the present invention, a consumable nozzle for electric welding as herein described is formed of at least three wires disposed side by side and together forming a closed ring in cross-section, the wires together defining a central orifice which extends the length of the nozzle and through which an electrode wire may be passed.

The wires may all extend parallel to the longitudinal axis of the nozzle, or may each define a helix.

The consumable nozzle may be formed of four wires of similar cross-section. The addition of two similar wires at one side of and parallel to the four-wire nozzle provides a second orifice through which an electrode wire may be passed.

Five or more wires may be secured together to form a consumable nozzle, the centres of these wires in cross-section lying in a ring and each wire being in contact with only two adjacent wires.

The invention also includes a method of electric welding an upwardly extending seam between metal workpieces in which a consumable nozzle is disposed in the seam and arranged to guide an electrode wire to the welding point, wherein the consumable nozzle is as described herein. The wire feeding mechanism for the electrode wire may be disposed remotely from the upper end of the consumable nozzle and arranged to direct the electrode wire to the consumable nozzle through a flexible conduit.

A number of consumable nozzles in accordance with the present invention, and the method of welding in which they are used will now be described by way of example with reference to the acompanying drawing in which.

Figure 1:
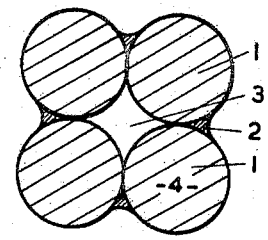
FIGURE 1 is a cross-section of a consumable nozzle fabricated from four welding wires.
Figure 2:
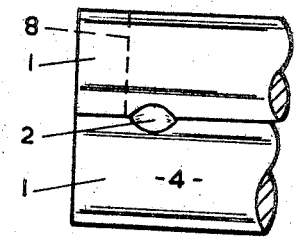
FIGURE 2 is a side view taken at one end of the consumable nozzle in FIGURE 1.

Referring to FIGURES 1 and 2, a consumable nozzle 4 is fabricated from four similar straight welding wires 1 of conventional circular cross-section disposed side by side with their axes parallel to the longitudinal axis of the nozzle. Adjacent wires are in contact with one another, so forming a closed ring in cross-section, and are maintained in this relationship by tack welds 2 spaced along the length of the nozzle. At any cross-section of the nozzle the centres of the wires form the corner points of a square having side lengths equal to the diameter of the welding wires. The space 3 extending the length of the nozzle between the wires forms a passage along which an electrode wire of smaller cross-section may pass.

One consumable nozzle fabricated in lengths of three feet from four welding wires as shown in FIGURES 1 and 2 was successfully used for consumable nozzle electroslag welding at welding currents of 750 amperes on steel plate of ¾ inch thickness. The welding wires were of 5/16 inch diameter, and an electrode wire of 3/32 inch diameter was passed through the nozzle.

A second consumable nozzle was fabricated in the same way from four welding wires but this time of wire ¼ inch in diameter. An electrode wire of 5/64 inch diameter was passed through the nozzle, and successful welding at welding currents of 500 amperes was effected.

The metal cross-sectional area of nozzle constructed of four ¼ inch diameter wires is approximately 0.2 square inch, whereas with four wires of 5/16 inch diameter the cross-sectional area is approximately 0.3 square inch. The prior art tubes of constant wall thickness used as consumable nozzles for electroslag welding at currents from 500 to 750 amperes have also generally had cross-sectional areas of metal of from 0.2 to 0.3 square inch.

For efficient operation the passage within a consumable nozzle through which the electrode wire passes should not have effective cross-sectional dimensions appreciably larger than those of the electrode wire. The particular four wire construction of consumable nozzle described above is therefore more suitable for the passage of electrode wires of 3/32 and 5/64 inch diameter than the electrode wires, of ⅛ inch to ¼ inch, used currently for such welding. As these smaller diameter wires are more readily passed through a flexible conduit it is possible, although not essential, to take advantage of this fact and to mount the wire feeding mechanism at a point remote from the upper end of the consumable nozzle, directing the electrode wire to the consumable nozzle through a flexible conduit. A diagrammatic elevation of such an apparatus is shown in FIGURE 5 to which reference should now be made.

Figure 5:
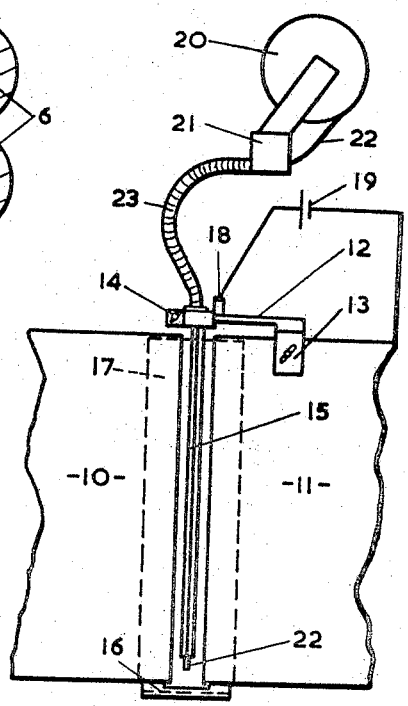
FIGURE 5 is a diagramatic elevation of a welding apparatus by means of which a consumable nozzle according to the invention may be used.

In FIGURE 5 two metal plates 10 and 11 to be welded together are shown supported in a vertical plane with a gap between their opposing edges. A clamping device 12 is adapted to be clamped to plate 11 by jaws 13 and also to grip, by means of a clamp 14, the upper end of a consumable nozzle 15. This consumable nozzle may be as shown in FIGURES 1 and 2 and is disposed in the seam parallel to and out of contact with the opposing plate edges. A starter block 16 is positioned at the base of the seam and both open sides of the seam are closed by water-cooled shoes 17. A terminal 18 on the clamping device 12 serves to introduce welding current into the consumable nozzle 15 from a power source 19. Electrode wire 22 is drawn off a spool 20 by a wire feed mechanism 21 and fed into the consumable nozzle 15. It is a feature of the invention that the electrode wire 22 may be of small diameter and that it may be fed through a flexible conduit 23 to the consumable nozzle, thus permitting the wire feed mechanism 21 and spool 20 to be disposed remotely from the clamping device 12, for example on the floor or suspended from a boom.

Figure 3:
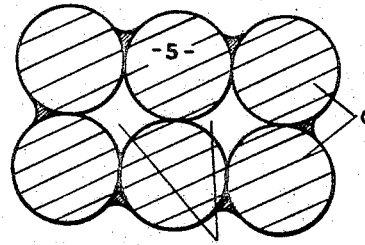
FIGURE 3 is an alternative construction of consumable nozzle having six welding wires adapted to guide two electrode wires.

To initiate welding the electrode wire 22 is fed into contact with the starter block 16 by the wire feed mechanism 21. A submerged arc supplied with welding current from power source 19 is initially formed under a layer of flux and the process then changes to the known electroslag process with a layer of molten slag covering the solidifying weld metal. The consumable nozzle 15 melts off progressively as the level of molten slag and weld metal rises in the seam.

Where two electrode wires are required to pass separately through a consumable nozzle an additional passage for electrode wire may be formed by adding two further welding wires at one side of the four-wire nozzle described above. Such a nozzle, 5, is shown in cross-section in FIGURE 3, the six welding wires 6 defining two parallel spaces 7 one for each of the electrode wires. Other combinations are also possible, eight wires providing three wire guiding passages in line, and so on.

Figure 4:
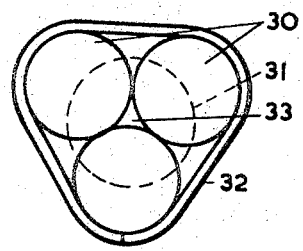
FIGURE 4 is a further construction of consumable nozzle fabricated from three welding wires.

Alternatively three, five, six or more wires can be secured together so that in cross-section the centres of these wires lie in a closed ring, each wire being in contact with only two adjacent wires. A three wire nozzle is shown in FIGURE 4, the wires 30 having their centres in a closed ring 31 and being held together by a clip 32. The electrode wire orifice is at 33.

Although it is preferred that the wires forming the consumable nozzle are all of the same cross-section, this is not essential, and it will also be appreciated that one or more wires of different metallurgical composition may be used to produce a desired resultant composition or condition of deposited weld metal. This is a useful facility where alloy metal is to be deposited, one of the wires having a higher proportion than the others of a specific alloying element. As a further alternative one of the wires may be formed of metal strip enclosing a core of compacted powdered metal to produce a desired alloying effect. Alternatively a metal strip constituting one wire may have a core of compacted powdered slag forming or other fluxing material.

To secure the wires together tack welds, as shown in FIGURE 2, or seam welds may be used, taking care that weld metal does not penetrate between adjacent wires to such an extent as to obstruct the free passage of electrode wire through the consumable nozzle. In some instances it may be suitable to secure the wires together by means of a surrounding clip, as shown in FIGURE 4, and this clip may be formed of or coated with an insulating material, possibly of fluxing material. In all instances the consumable nozzle may be provided with insulating material adapted to space the nozzle from the edges of the plates being welded.

Where a sufficiently long length of consumable nozzle is not readily available two or more shorter lengths may be welded together. Alignment may be facilitated if the ends of the wires forming the nozzles do not lie in a single plane, the wires of all of the nozzles being of similar length but being staggered longitudinally in relation to the adjacent wires by a uniform amount. Thus in FIGURE 2 one of the wires may be positioned with its end at the broken line 8, and with its opposite end projecting by a corresponding distance from the ends of the other wires.

I claim:

1. A consumable nozzle for consumable nozzle electric welding formed of at least three wires disposed side by side and together forming a closed ring in cross-section, the wires together defining a central orifice which extends the length of the nozzle and through which an electrode wire may be passed.

2. A consumable nozzle as claimed in claim 1, wherein the wires all extend parallel to the longitudinal axis of the nozzle.

3. A consumable nozzle as claimed in claim 1, wherein the wires each define a helix.

4. A consumable nozzle as claimed in claim 1, formed of four wires of similar circular cross-section.

5. A consumable nozzle as claimed in claim 4, wherein an additional two similar wires are disposed at one side of and parallel to the four-wire nozzle thereby providing a second orifice through which an electrode wire may be passed.

6. A consumable nozzle as claimed in claim 1, comprising five or more wires secured together so that in cross-section the centres of these wires lie in a ring, each wire being in contact with only two adjacent wires.

7. A consumable nozzle as claimed in claim 1, wherein one of the wires differs from the other wires in its metallurgical composition.

8. A consumable nozzle as claimed in claim 7, wherein one of the wires has a metal sheath enclosing a core of powdered metal.

9. A consumable nozzle as claimed in claim 1, wherein one of the wires has a metal sheath enclosing a core of slag-forming or other fluxing material.

10. A method of electric welding an upwardly extending seam between metal workpieces by the consumable nozzle electric welding process, wherein the consumable nozzle disposed in the seam and arranged to guide an electrode wire to the welding point is formed of at least three wires disposed side by side and together forming a closed ring in cross-section, the wires together defining a central orifice which extends the length of the nozzle, and an electrode wire is passed through said central orifice and has electric current conducted to it by the said three wires.

11. A method of electric welding as claimed in claim 10, wherein a wire feeding mechanism for the electrode wire is disposed remotely from the upper end of the consumable nozzle and is arranged to direct the electrode wire to the consumable nozzle through a flexible conduit.

References Cited

UNITED STATES PATENTS

| | | | |
|---|---|---|---|
| 1,953,915 | 4/1934 | Burgett et al. | 219—136 |
| 2,360,743 | 10/1944 | Tuttle | 314—129 |
| 2,435,800 | 2/1948 | Sawhill et al. | 219—146 |
| 2,520,112 | 8/1950 | Bourque et al. | 219—146 |
| 2,868,951 | 1/1959 | Shrubsall | 219—74 |

RICHARD M. WOOD, *Primary Examiner.*